(12) United States Patent
Nielsen

(10) Patent No.: US 10,265,936 B2
(45) Date of Patent: Apr. 23, 2019

(54) SYSTEM AND METHOD OF MANUFACTURING A WIND TURBINE BLADE

(71) Applicant: LM WP PATENT HOLDING A/S, Kolding (DK)

(72) Inventor: Lars Nielsen, Skanderborg (DK)

(73) Assignee: LM WP PATENT HOLDING A/S, Kolding (DK)

( * ) Notice: Subject to any disclaimer, the term of this patent is extended or adjusted under 35 U.S.C. 154(b) by 790 days.

(21) Appl. No.: 14/647,303

(22) PCT Filed: Dec. 2, 2013

(86) PCT No.: PCT/EP2013/075213
§ 371 (c)(1),
(2) Date: May 26, 2015

(87) PCT Pub. No.: WO2014/086703
PCT Pub. Date: Jun. 12, 2014

(65) Prior Publication Data
US 2015/0308402 A1    Oct. 29, 2015

(30) Foreign Application Priority Data
Dec. 3, 2012 (EP) .................................... 12195249

(51) Int. Cl.
*F03D 1/06*    (2006.01)
*B29C 65/00*   (2006.01)
(Continued)

(52) U.S. Cl.
CPC .............. *B32B 37/18* (2013.01); *B29C 65/52* (2013.01); *B29C 66/1122* (2013.01);
(Continued)

(58) Field of Classification Search
CPC . B29C 66/3242; B29C 66/474; B29C 66/524; B29C 66/532; B29C 66/61;
(Continued)

(56) References Cited

U.S. PATENT DOCUMENTS

| 7,895,745 B2 * | 3/2011 | Althoff | ................. F03D 1/0675 29/463 |
| 2009/0226702 A1 * | 9/2009 | Madsen | .............. B29C 65/5028 428/317.1 |

(Continued)

FOREIGN PATENT DOCUMENTS

WO      2010023140 A1    3/2010

*Primary Examiner* — Igor Kershteyn
*Assistant Examiner* — Christopher R Legendre
(74) *Attorney, Agent, or Firm* — Nath, Goldberg & Meyer; Jerald L. Meyer; Tanya E. Harkins

(57) ABSTRACT

A method of joining components of a wind turbine blade involves the use of an adhesive arrestor rail positioned at the side of a joining surface of a first member of a wind turbine blade, the rail arranged to form an acute angle to a second opposed joining surface of a second member of a wind turbine blade. The arrestor rail acts to retain flowable adhesive within the bonding area between two joining surfaces, ensuring a full and complete bond is provided between the blade members. The rail provides a valve action, deflecting to allow for excess adhesive to extrude past the rail, indicating that the bonding area between the joining surfaces is filled with adhesive. The arrangement of the arrestor rail results in a tapering edge of the adhesive bond layer between two members. The arrangement provides a reduced likelihood of substantial crack formation in the adhesive bond layer.

20 Claims, 7 Drawing Sheets

(51) Int. Cl.
- B29C 65/52 (2006.01)
- B32B 37/12 (2006.01)
- B32B 37/18 (2006.01)
- B29D 99/00 (2010.01)
- F03D 13/10 (2016.01)
- B29L 31/00 (2006.01)
- B29L 31/08 (2006.01)

(52) U.S. Cl.
CPC ........ *B29C 66/3242* (2013.01); *B29C 66/474* (2013.01); *B29C 66/524* (2013.01); *B29C 66/532* (2013.01); *B29C 66/61* (2013.01); *B29C 66/721* (2013.01); *B29D 99/0028* (2013.01); *B32B 37/1284* (2013.01); *F03D 1/0675* (2013.01); *F03D 13/10* (2016.05); *B29C 66/7212* (2013.01); *B29C 66/8322* (2013.01); *B29L 2031/003* (2013.01); *B29L 2031/085* (2013.01); *B32B 2603/00* (2013.01); *Y02E 10/721* (2013.01); *Y02P 70/523* (2015.11)

(58) Field of Classification Search
CPC .............. B29C 66/721; B29C 66/7212; B29C 66/8322; B32B 37/1284; B32B 37/18; B32B 2603/00; F03D 1/0675; Y02E 10/721

See application file for complete search history.

(56) References Cited

U.S. PATENT DOCUMENTS

| | | |
|---|---|---|
| 2011/0142674 A1 | 6/2011 | Dixon |
| 2012/0027610 A1 | 2/2012 | Yarbrough |
| 2012/0027613 A1 | 2/2012 | Yarbrough |
| 2012/0027614 A1 | 2/2012 | Yarbrough |
| 2012/0114497 A1 | 5/2012 | Petersen et al. |
| 2015/0308402 A1* | 10/2015 | Nielsen .................. B29C 65/52 416/229 R |

* cited by examiner

SYSTEM AND METHOD OF MANUFACTURING A WIND TURBINE BLADE

This is a National Phase Application filed under 35 U.S.C. 371 as a national stage of PCT/EP2013/075213, filed Dec. 2, 2013, an application claiming the benefit of European Application No. 12195249.3, filed Dec. 3, 2012, the content of each of which is hereby incorporated by reference in its entirety.

FIELD OF THE INVENTION

The present invention relates to a method for the manufacture of a wind turbine blade, in particular a method of manufacturing for ensuring adequate adhesive bonds between members of a wind turbine blade.

BACKGROUND OF THE INVENTION

Modern utility-scale wind turbines utilise wind turbine blades of relatively large size, often exceeding 40 meters in length. Such blades are mostly manufactured using fibre-composite materials, which comprise a fibre, e.g. fibreglass, carbon fibres, held in a cured resin. One common manufacturing process used in the construction of these blades is the moulding of separate sections or shells of a wind turbine blade in separate moulds, the different sections or shell subsequently assembled together to form a complete wind turbine blade.

Often, such blade sections will be assembled having an internal spar element, e.g. a spar box or a shear web, extending between opposed blade sections, the spar element providing shear strength and reinforcement to the wind turbine blade structure.

With reference to FIG. 1, a cross-sectional illustration is provided of a joining between a portion of a blade shell or section 110 and an internal spar element, in this case an I-shaped shear web 112. The I-web 112 comprises a joining surface 114 which is arranged to bond to a corresponding joining surface 116 provided on the blade shell 110. A portion of resin or adhesive 118 is provided on the joining surface 114, and the I-web 112 is applied against the surface 116 of the blade shell 110, such that the adhesive 118 spreads between the two surfaces 114,116 to bond the shear web 112 to the blade shell 110.

However, this approach can often present subsequent problems during blade operation. With reference to FIG. 2, an example is illustrated of the system of FIG. 1 after curing of the adhesive 118 into an adhesive bonding layer 120 between the I-web 112 and the blade shell 110. In a first aspect, the bonding layer 120 is one of the most likely locations for subsequent blade failure, due to the increased possibility of crack formation at the interface between the adhesive bond layer 120 and the blade shell, indicated at 122.

A further drawback of the approach adopted in FIG. 1 is that it is difficult to guarantee that the adhesive 118 will spread evenly between the joining surfaces 114,116. This may be as a result of an uneven initial application of adhesive to the first joining surface 114, and/or the first joining surface being pressed towards the second joining surface 116 at an angle, resulting in an uneven distribution of pressure forces.

In the example shown in FIG. 2, the adhesive 118 has not fully spread between the joining surfaces 114,116, resulting in the formation of an adhesive bonding layer 120 which does not extend across the full extent of the space between the joining surfaces 114,116, indicated by empty space 124 defined between the joining surfaces 114,116. As a result, the strength of the adhesive bond between the joining surfaces 114,116 is reduced, which may lead to bond failure between the blade components 110,112.

To avoid such a failure, blade designers often adopt at least one of the following approaches. Firstly, adhesive 118 can be applied in a quantity considerably in excess of what is sufficient to fill the space between the joining surfaces 114,116, with the hope that such an excess amount will ensure that the area between the joining surfaces 114,116 is filled with adhesive. However, this approach leads to a wasteful use of adhesive during blade manufacture. Additionally, any excess adhesive which cures outside of the area between the joining surfaces 114,116 will often break away some time subsequent to curing, resulting in loose debris within the interior of a wind turbine blade. Finally, the use of such an excess quantity of adhesive does not completely guarantee that the area between the joining surfaces 114,116 will be filled with adhesive, as additional factors such as the direction in which pressure is applied to the I-web 112 when joining to the blade shell 110 may still result in an uneven application of adhesive between the joining surfaces 114, 116.

A second approach is that the blade components, in particular spar elements such as I-web 112, are designed to be over dimensioned, such that the structural integrity of the wind turbine blade is not significantly compromised in the event that the adhesive layer 120 does not extend across the entire extent of the area between the joining surfaces 114, 116. However, this over-dimensioning approach results in an inefficient use of resources, and increases the cost and weight of the wind turbine blade.

Finally, wind turbine manufacturers can decide to survey the adhesive layer 120 between the joining surfaces 114,116 after curing of the adhesive 118, to ensure that there is an adequate bond between components 110,112. In the event of an incomplete bond, a subsequent repair operation can be performed, through the application of additional adhesive to the affected area. However, such an approach can be relatively costly and time-consuming, in particular when it has to be carried out on a closed wind turbine structure, where the surveying and subsequent repair operations must be carried out from the exterior of the blade, e.g. using ultrasonic detection to identify the size of adhesive bond layers 120, and pumping additional resin or adhesive from the exterior of the blade to the interior to provide for adequate bonding.

US Patent Application Publication No. US 2012/0114497 discloses the use of a resin barrier applied to a joining surface between members of a wind turbine blade, to define a cavity between the blade members. Resin can them be pumped into said cavity, to ensure that the adhesive fully fills the defined cavity between the members. However, this approach requires considerable additional preparation during blade manufacture, in the accurate placement of the resin barrier as well as the subsequent pumping of adhesive into the defined cavity, thereby increasing the complexity and time of the manufacturing process. Furthermore, this system does not address the problem of bonding failure at the interface of adhesive joints between the blade members.

US 2012/0027613 and US 2012/0027610 disclose spring flange members as part of a connection assembly between transverse ends of a shear web and a spar cap.

Accordingly, it is an object of the invention to provide a method of manufacturing a wind turbine blade, in particular a method of joining two wind turbine blade components, which provides for improved reliable bonding between components balanced with a relatively simple implementation, compared to prior art systems.

SUMMARY OF THE INVENTION

Accordingly, there is provided a method of manufacturing a wind turbine blade, the method comprising the steps of:
providing a first member having a first joining surface;
providing a second member having a second joining surface;
providing at least one adhesive arrestor rail at a first side of said first joining surface of said first member;
providing a quantity of flowable adhesive between said first and second joining surfaces;
pressing said first and second members together, to spread said quantity of flowable adhesive to form an adhesive layer between said first and second joining surfaces; and
curing said adhesive layer to bond said first member to said second member,
wherein said at least one adhesive arrestor rail is formed of a relatively flexible material, such that during said step of pressing, said at least one adhesive arrestor rail is arranged to deflect to allow excess flowable adhesive to be extruded past said at least one adhesive arrestor rail.

Preferably, said step of pressing is performed until an amount of excess flowable adhesive is extruded past said at least one adhesive arrestor rail, to indicate that said flowable adhesive substantially fills the space between said first and second joining surfaces at said first side.

As the components are pressed together, when excess adhesive is extruded beyond the adhesive arrester rail, an operator can deduce that the bonding area between the components is filled with adhesive, at least for the portion adjacent where the excess adhesive has extruded beyond the rail. Accordingly, this provides a clear indication that sufficient adhesive has been applied to the joining area between the components, such that the area up to the rail is filled with adhesive. It will be understood that the stiffness or resilience of the rail may be chosen such that the rail resists the passage of excess adhesive beyond the rail until the area behind the rail has been filled with adhesive, thereby eliminating gaps or air pockets in the adhesive layer between the surfaces.

Preferably, the method comprises the steps of
providing a first adhesive arrestor rail at a first side of said first joining surface; and
providing a second adhesive arrestor rail at an opposed second side of said first joining surface,
such that an adhesive channel is defined by said first and second joining surfaces and said first and second adhesive arrestor rails after said step of pressing.

Having first and second rails to define a channel means that the entire bonding area between the members can be easily defined. It will be understood that one of said first or second rails may be formed of a more resilient or stiffer materials than the other, such that excess adhesive is, initially at least, only extruded beyond one of the rails.

Preferably, said second adhesive arrestor rail is formed from a relatively flexible material, and wherein said step of pressing is performed until an amount of excess flowable adhesive is extruded past said first and second adhesive arrestor rails, to indicate that said flowable adhesive substantially fills the adhesive channel between said first and second members.

Preferably, said step of providing a quantity of adhesive comprises selecting a quantity of adhesive to be applied such that the adhesive layer will substantially fill said adhesive channel after said step of pressing.

Preferably, said step of selecting comprises selecting a quantity of adhesive having a greater volume per unit length than the volume per unit length enclosed by said adhesive channel, such that said adhesive channel is filled by adhesive after said step of pressing.

Preferably, said step of selecting comprises selecting a quantity of adhesive of at least 105% of volume per unit length of said adhesive channel, further preferably at least 110% of volume per unit length of said adhesive channel. Such values ensure that the adhesive channel will be filled with adhesive, with minimal wastage of excess adhesive extruded beyond the adhesive rail(s).

Preferably, said at least one adhesive arrestor rail is arranged at a non-orthogonal angle to the second joining surface of said second member, such that said adhesive layer comprises a substantially tapering profile at said first side of said first joining surface.

Preferably, the method comprises the step of providing said at least one adhesive arrestor rail with a retaining flange provided at a second free end of said at least one adhesive arrestor rail, said retaining flange arranged to retain any excess adhesive extruded past said second free end of said at least one adhesive arrestor rail.

The retaining flange may have a curved profile, or may comprise a planar flange projection.

Preferably, said first member is provided as at least a portion of a spar element of a wind turbine blade, preferably an I-web, alternatively a C-web, a spar box.

In one aspect, said at least one adhesive arrestor rail is attached to said at least a portion of a spar element of a wind turbine blade. The rail may be attached using adhesives, or mechanical attachments, e.g. a snap-clip arrangement, bolting, riveting, etc.

In a further aspect, the at least one adhesive arrestor rail is removed after said step of curing. This can allow for the re-use of the rail in the manufacturing process. It will be understood that the rail may be provided with a release liner or a suitable release primer coating for this purpose.

Alternatively, it will be understood that the at least one adhesive arrestor rail can be left in situ.

In an alternative aspect, said at least one adhesive arrestor rail is integrally formed with said at least a portion of a spar element of a wind turbine blade. The rail may be formed as part of the spar element using any suitable process, e.g. pultrusion, extrusion, as part of a fibre-composite structure infused with resin, etc.

Preferably, the method comprises the step of forming said at least one adhesive arrestor rail from a relatively resilient material such that during said step of pressing, said at least one adhesive arrestor rail is arranged to deflect to extrude said excess flowable adhesive past said at least one adhesive arrestor rail, and wherein said at least one adhesive arrestor rail is arranged to return to an undeflected state after excess flowable adhesive has been extruded past said at least one adhesive arrestor rail.

Preferably, said at least one adhesive arrestor rail is provided such that a first end of said rail is attached to said first member adjacent said first joining surface, wherein after said step of pressing a second free end of said rail is located adjacent said second joining surface of said second member.

Preferably, said at least one adhesive arrestor rail is provided such that after said step of pressing said second free end of said rail is arranged at an acute angle to said second joining surface of said second member.

Preferably, the method comprises the step of providing said at least one adhesive arrestor rail having a curved cross-sectional profile, such that after said step of pressing said adhesive layer assumes a corresponding curved cross-sectional profile at said first side of said first joining surface.

Preferably, said at least one adhesive arrestor rail comprises a substantially sine-wave shaped profile.

Preferably, said second member is provided as at least a portion of a shell of a wind turbine blade.

In one aspect, said step of pressing is performed until an amount of excess flowable adhesive is extruded past a free end of said at least one adhesive arrestor rail, along substantially the entire longitudinal length of the said at least one adhesive arrestor rail.

There is also provided a method of manufacturing a wind turbine blade, the method comprising the steps of:

providing a first member having a first joining surface;
providing a second member having a second joining surface;
providing at least one adhesive arrestor rail at a first side of said first joining surface of said first member, said at least one adhesive arrestor rail having a first end arranged at said first member and an opposed second free end;
providing a quantity of flowable adhesive between said first and second joining surfaces;
pressing said first and second members together, to spread said quantity of flowable adhesive to form an adhesive layer between said first and second joining surfaces; and
curing said adhesive layer to bond said first member to said second member,
wherein said at least one adhesive arrestor rail is provided with a retaining flange at said second free end of said at least one adhesive arrestor rail, said retaining flange arranged to retain any excess adhesive which may be extruded past said second end of said at least one adhesive arrestor rail.

By providing an adhesive arrestor rail having an adhesive retaining flange at the free end of the rail, this ensures that if excess adhesive is pushed beyond the arrestor rail, it will be retained substantially in situ adjacent the arrestor rail. Accordingly, after curing, the excess adhesive will not be prone to break off inside in a wind turbine blade, as debris in the blade interior.

It will be understood that the retaining flange may be arranged such that the retaining flange abuts a surface of the second member, thereby forming a substantially closed channel for the retention of any excess adhesive. Alternatively, the retaining flange may be arranged to extend adjacent the second member, providing a gutter or catchment arm for any excess adhesive.

Additionally or alternatively, there is provided a method of manufacturing a wind turbine blade, comprising the steps of:

providing a first member having a first joining surface;
providing a second member having a second joining surface;
providing a quantity of flowable adhesive between said first and second joining surfaces;
pressing said first and second members together, to spread said quantity of flowable adhesive to form an adhesive layer between said first and second joining surfaces; and
curing said adhesive layer to bond said first member to said second member,
wherein, prior to said step of pressing, the method comprises the step of providing at least one adhesive arrestor rail at a first side of said first joining surface of said first member, said adhesive arrestor rail arranged at a non-orthogonal angle to the second joining surface of said second member, wherein a portion of said flowable adhesive is pushed against said adhesive arrestor rail by said step of pressing, such that said adhesive layer comprises a substantially tapering profile at said first side of said first joining surface.

The use of an adhesive arrestor rail at the side of the joining surfaces acts to retain the flowable adhesive between the joining surfaces as the first and second members are pressed together. The tapering profile is defined by the adhesive arrestor rail. The angled arrangement of the rail acts to force the adhesive layer to assume a tapered profile along the edge of the adhesive layer. Accordingly, the height of the adhesive layer above the member surfaces is reduced at the edge of the layer. As the energy release rate of the adhesive layer is found to be related to the height of the adhesive layer above the member surface, the tapered edge profile of the adhesive layer results in a reduction in crack formation in the adhesive layer of the finished wind turbine blade. Preferably, said at least one adhesive arrestor rail comprises a substantially planar element.

Preferably, said first member comprises at least a portion of a spar element of a wind turbine blade.

A spar element may comprise any element used in the reinforcement of a wind turbine blade, generally an internal member extending along at least a portion of the longitudinal extent of the blade. The spar element may for example comprise a spar box, a shear web such as an I-web, a C-web, etc.

Preferably, said second member comprises at least a portion of a shell of a wind turbine blade.

The outer body of a wind turbine blade may be formed from a plurality of blade shells which are formed in a blade mould, and which are subsequently assembled to form the blade outer body. For example, blade shells may substantially form respective upwind and downwind sides of a wind turbine blade.

It will be understood that the first and/or second members may comprise subsections of a larger wind turbine blade structure, preferably for a portion of the longitudinal extent of a wind turbine blade. For example, the second member may comprise a subsection of a shell for a wind turbine blade, the first member comprising a portion of a spar element for bonding to said subsection of a shell for a wind turbine blade.

Preferably, said at least one adhesive rail is provided along substantially the entire length of the first and second members. However, such an implementation may result in additional working of the manufacturing process.

The at least one adhesive rail may be provided along those areas of the wind turbine blade most susceptible to bonding interface failure. In one aspect, said at least one adhesive arrestor rail is provided at said first and second members within 0-75% of the longitudinal extent of the wind turbine blade, measured from a root end of said blade to a tip end of said blade. In an alternative aspect, the rail may be provided within 25-75% of the longitudinal extent. In a further alternative, the rail may be provided within 0-25% of the longitudinal extent.

In one aspect, said at least one adhesive arrestor rail is provided at said first and second members within 0-15% of the longitudinal extent of the wind turbine blade, measured from a root end of said blade to a tip end of said blade.

For example, for a blade of 40 meters length, in such an embodiment the adhesive arrestor rail is provided in the area between 0-6 meters from the root end of the blade.

Preferably, said at least one adhesive arrestor rail is provided at said first and second members up to the location of maximum chord of the wind turbine blade.

Preferably, said at least one adhesive arrestor rail is provided such that a first end of said rail is attached to said first member adjacent said first joining surface, wherein after said step of pressing a second end of said rail is located adjacent said second joining surface of said second member.

The rail is arranged such the shape and length of the rail is configured to extend between the first and second members, when the members are pressed together to join the members to each other.

Preferably, said at least one adhesive arrestor rail is provided such that after said step of pressing said second end of said rail is arranged at an acute angle to said second joining surface of said second member.

The rail projects at an angle from the first member such that the rail forms an acute angle to the surface of the second member when the first and second members are pressed together. This acute angle creates a tapering cross-sectional profile for the adhesive layer between the members, when the flowable adhesive is pressed against the rail during the step of pressing.

In a preferred aspect, said at least one adhesive arrestor rail comprises a curved cross-sectional profile, such that after said step of pressing said adhesive layer assumes a corresponding curved cross-sectional profile at said first side of said first joining surface.

The use of a curved rail acts to form a curved cross-sectional profile of the edge of the adhesive layer. Such a curved boundary acts to evenly distribute forces at the boundary of the adhesive layer, further reducing the possibility of adhesive failure during operation of the wind turbine blade.

Preferably, said at least one adhesive arrestor rail comprises a convex profile between said first and second ends, such that after said step of pressing said adhesive layer assumes a concave cross-sectional profile at said first side of said first joining surface.

Preferably, said at least one adhesive arrestor rail is sine-wave-shaped.

In preferred embodiment, said at least one adhesive arrestor rail is provided such that after said step of pressing, said second end of said adhesive arrestor rail is provided in contact with said second joining surface.

By arranging the rail to contact the surface of the second member when the flowable adhesive is pressed against the rail, the boundary or edge of the subsequent adhesive layer will taper fully to the surface of the second member. Such an adhesive layer which fully tapers to the surface of the second member has a considerably reduced energy release rate compared to prior art adhesive layer boundaries, leading to a reduction in the possibility of boundary failure during blade operation.

Preferably, said at least one adhesive arrestor rail is formed from a relatively flexible material, such that during said step of pressing, said at least one adhesive arrestor rail is arranged to deflect to allow excess flowable adhesive to be extruded past said second end of said rail.

By having a flexible adhesive arrestor rail, the rail can act as a simple valve, which allows excess adhesive to exit from the adhesive channel defined by the joining surfaces and the at least one rail. Accordingly, the quantity of adhesive which is provided can be selected to ensure that the volume of adhesive will fill the desired area between the joining surfaces, with the possibility of providing a volume of adhesive plus an excess amount, e.g. 110% of required adhesive volume. In such a case, the action of pressing the members together will ensure that the adhesive will fill the area between the joining surfaces, with any excess adhesive passed by the valve action of the rail.

Further preferably, said at least one adhesive arrestor rail is formed from a relatively resilient material such that during said step of pressing, said at least one adhesive arrestor rail is arranged to return to an undeflected state after excess flowable adhesive has been extruded past said second end of said rail.

By having a resilient rail, the rail will return to a contact position with the surface of the second member, such that the height of the adhesive layer above the surface of the second member will taper to 0 at the edge of the adhesive layer, maintaining a low possibility of adhesive failure during operation.

In one aspect, said at least one arrestor rail is formed from a plastics material, e.g. pultruded plastic. In another aspect, said at least one arrestor rail is formed from a fibre-composite material, cured in a mould, e.g. a fibreglass material. In one preferred aspect, the arrestor rail is formed from biax 450 g/m2, preferably using two plies per arrestor rail.

Additionally or alternatively, said step of providing at least one adhesive arrestor rail comprises providing a second end of said rail having a serrated edge.

The use of a serrated edge may allow for an extrusion of the flowable adhesive past the second end of the rail. In such a case, the rail may be formed from a rigid inflexible member, e.g. hard plastic, metal, etc., or from a flexible medium as described above.

Alternatively, said at least one adhesive arrestor rail is provided such that after said step of pressing, said second end of said adhesive arrestor rail is spaced from said second joining surface by a distance D, wherein D≤5 mm.

The rail can be arranged such that when the first and second members are pressed together either side of a desired height of adhesive layer, the arrestor rail will project from the first member to a height spaced from the surface of the second member. In this case, the edge of the adhesive layer will be shaped by the rail to have a tapering profile to the second end of the rail, which has a reduced height from the surface of the second member. Such a reduced height will reduce the possibility of adhesive layer failure, compared to prior art systems.

In a further aspect, said at least one adhesive arrestor rail comprises a retaining flange provided at the second end of said at least one adhesive arrestor rail, said retaining flange arranged to retain any excess adhesive extruded past said second end of said at least one adhesive arrestor rail.

As the rail is shaped beyond the second end to have a retaining flange, this acts to hold excess adhesive in place adjacent the surface of the second member. This prevents the excess adhesive detaching from the second member and forming loose debris within the interior of the wind turbine blade.

In one aspect, said at least one adhesive arrestor rail is provided as an integral part of said first member.

In this aspect, the first member may be formed with an integral arrestor rail. For example, the first member may be formed using a pultrusion process, to have a profile having an integrated arrestor rail, e.g. a pultruded I-web having integrated arrestor rails.

In an alternative aspect, the method comprises the step of mounting said at least one adhesive arrestor rail to said first member adjacent said first joining surface.

In this case, a pre-formed first member, e.g. a pre-formed spar box, I-web, etc. may be provided, where arrestor rails can be attached to the first member such that the rails are located adjacent the relevant joining surfaces of the first member. For example, the arrestor rail may be bonded to the first member using adhesives, the rail may be bolted to the first member, and/or a clip-on or snap-fit connection may be used where the rail and the first member have co-operating coupling elements for connection.

Preferably, the method comprises the steps of:

providing a first adhesive arrestor rail at a first side of said first joining surface; and providing a second adhesive arrestor rail at an opposed second side of said first joining surface, such that an adhesive channel is defined by said first and second joining surfaces and said first and second adhesive arrestor rails after said step of pressing.

Preferably, said step of providing a quantity of adhesive comprises selecting a quantity of adhesive to be applied such that the adhesive layer will substantially fill said adhesive channel after said step of pressing.

Preferably, said step of selecting comprises selecting a quantity of adhesive having a greater volume per unit length than the volume per unit length enclosed by said adhesive channel, such that said adhesive channel is filled by adhesive after said step of pressing.

The definition of an adhesive channel between the first and second members allows for a set area to be filled by adhesive, to ensure a satisfactory bonding between the elements of the wind turbine blade. It will be understood that the adhesive channel may be defined for a portion of the longitudinal extent of the first and second members where it is desired to ensure that the adhesive layer fills the area defined by the adhesive channel, in particular, for areas of the wind turbine blade where failure of the adhesive layer is most likely during blade operations, e.g. for that portion of the first and second members up to and around the maximum chord of the wind turbine blade.

The quantity of adhesive which is provided in the adhesive channel can be selected to ensure that the volume of adhesive will fill the desired area between the joining surfaces. By providing a volume of adhesive plus an excess amount, e.g. 110% of required adhesive volume, it will be ensured that the adhesive channel will be completely filled with adhesive, with any excess adhesive either extruded past the second end of the rails as described above, or forced further along the length of the adhesive channel, past the rails.

Preferably, said step of providing a quantity of adhesive comprises applying a quantity of adhesive to said first joining surface or to said second joining surface.

In a further aspect, said at least one adhesive arrestor rail is provided with a marker element, which enables the location of the position of the marker element to be determined when the adhesive arrestor rail is installed in a wind turbine blade.

For example, the adhesive arrestor rail may comprise a reflective element which is operable to reflect optical, radio-frequency, or ultrasonic signals from testing apparatus, e.g. from an ultrasound detector used on the external surface of a wind turbine blade. Such a reflective element can act to aid the location of the rail within the interior of the blade, and can accordingly act to define the boundary of adhesive layers, spare elements, etc. within the interior of a blade during non-destructive testing procedures.

In a further aspect, the method comprises the step of, subsequent to said step of pressing, removing said at least one adhesive arrestor rail.

In some cases, the rail may be removed after the members have been pressed together, and the flowable adhesive has settled into the adhesive layer between the two joining surfaces. The rail may then be re-used in the manufacture of subsequent blades. It will be understood that the rail may be removed after said step of curing has occurred.

It will be understood that the method provides an element comprising said first and second members bonded together via said adhesive layer, wherein said element may be used as components in the manufacture of a wind turbine blade. While the embodiments illustrated herein show the bonding between a blade shell and a spar element of a wind turbine blade, it will be understood that the method may be used to provide for an improved bonding between any elements of a wind turbine blade.

It will be understood that the features described in respect of the above methods, and the associated advantages of each, are interchangeable between the methods, without undue modification of the underlying processes.

There is also provided an adhesive arrestor rail for use in any aspect of the methods as described above.

There is also provided a wind turbine blade manufactured according to any aspect of the above-described methods.

DESCRIPTION OF THE INVENTION

Embodiments of the invention will now be described, by way of example only, with reference to the accompanying drawings, in which.

It will be understood that elements of the drawings which are replicated between embodiments are referred to using the same reference numerals.

Figure 1:
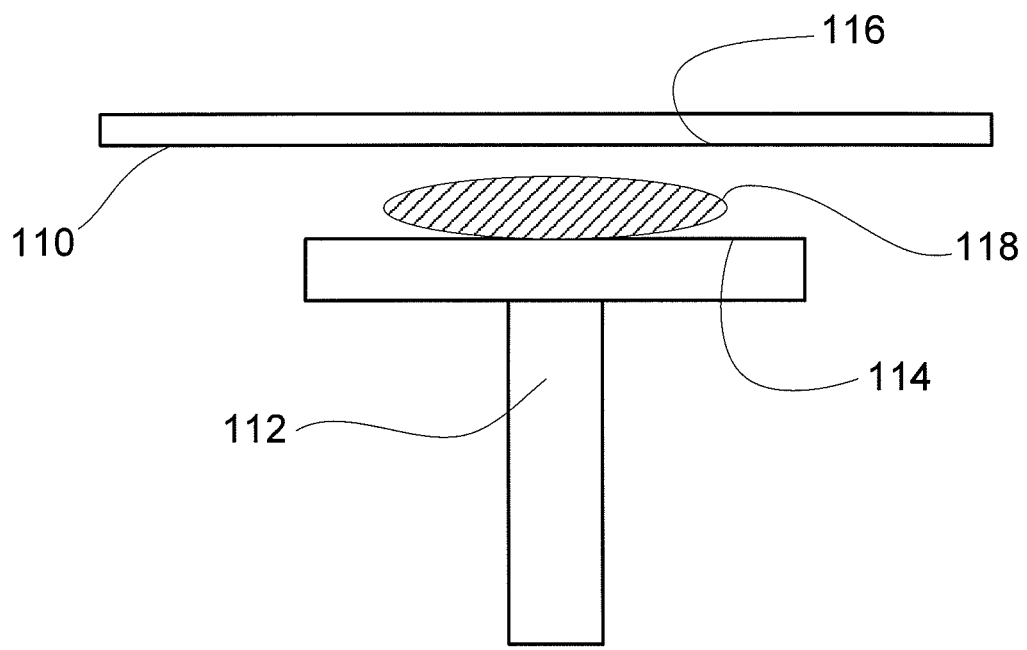
FIG. 1 shows a portion of a cross-sectional view of a prior art method of assembling components of a wind turbine blade.
Figure 2:
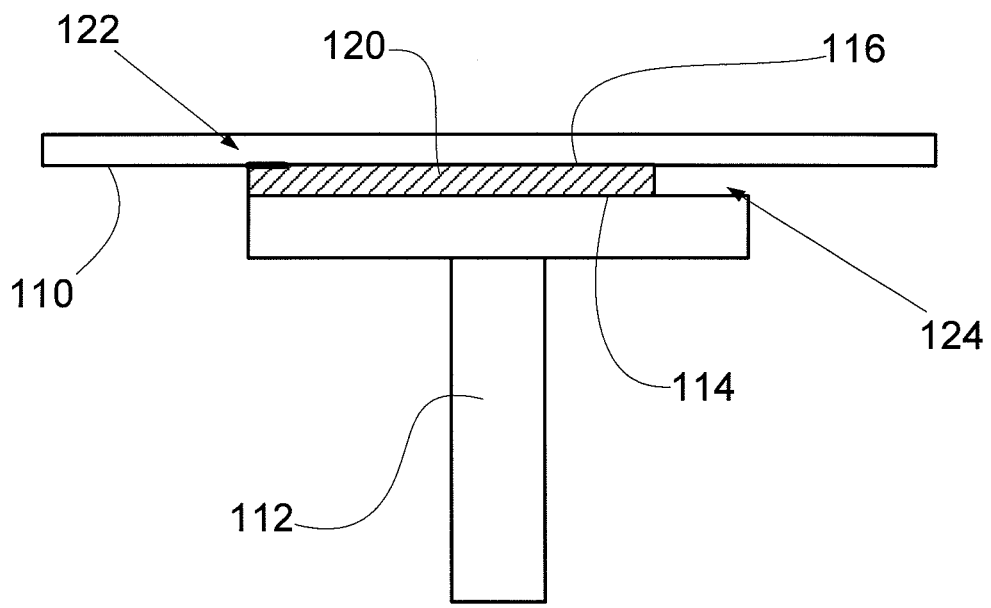
FIG. 2 shows the section illustrated in FIG. 1 after assembly.
Figure 3:
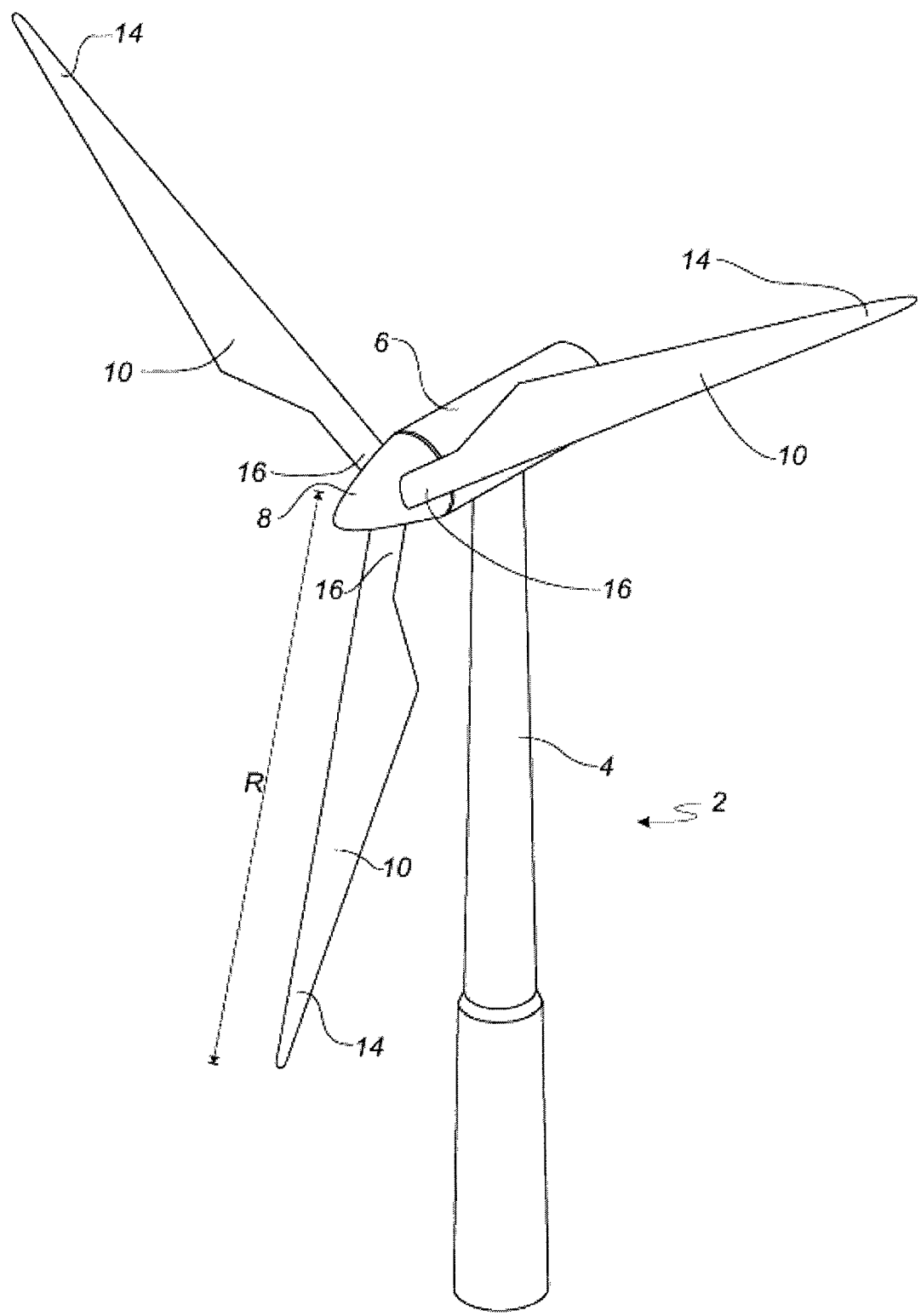
FIG. 3 shows a wind turbine.

FIG. 3 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

Figure 4:
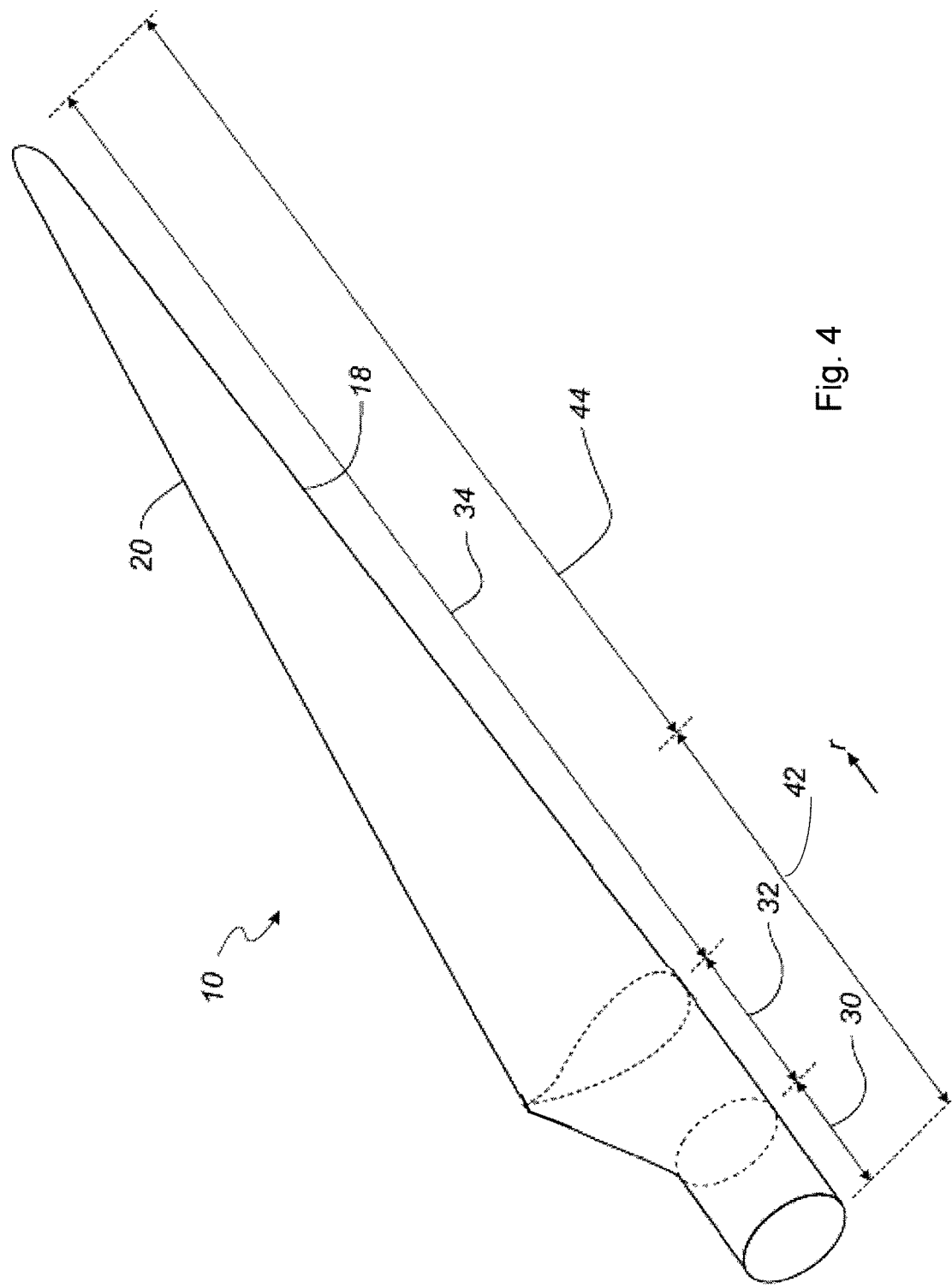
FIG. 4 shows a schematic view of a wind turbine blade.

FIG. 4 shows a schematic view of a first embodiment of a wind turbine blade 10 which may be used according to an embodiment of the invention. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 is typically constant along the entire root area 30. The transition region 32 has a transitional profile 42 gradually changing from the circular or elliptical shape of the root region 30 to an aerodynamic profile 44, as shown in FIG. 4, of the airfoil region 34. The chord length of the transition region 32 typically increases substantially linearly with increasing distance r from the hub.

The airfoil region 34 has an airfoil profile 44 with a chord extending between the leading edge 18 and the trailing edge 20 of the blade 10. The width of the chord decreases with increasing distance r from the hub.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

Figure 5:
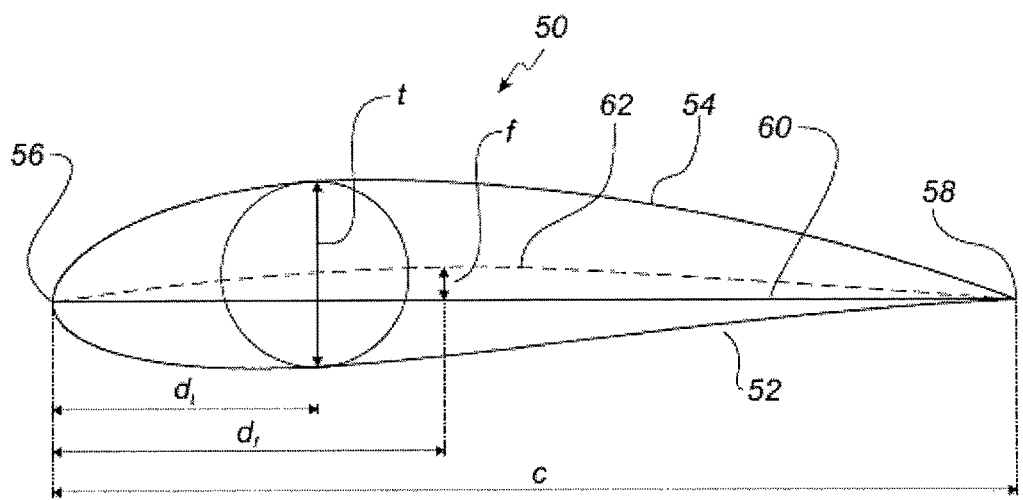
FIG. 5 shows a schematic view of an airfoil profile of a wind turbine blade.

FIG. 5 shows a schematic view of an airfoil profile 50 of a typical blade of a wind turbine depicted with the various parameters which are typically used to define the geometrical shape of the airfoil. The airfoil profile 50 has a pressure side 52 and a suction side 54, which during use—i.e. during rotation of the rotor—normally face towards the windward (or upwind) side and the leeward (or downwind) side, respectively. The airfoil profile 50 has a chord 60 with a chord length c extending between a leading edge 56 and a trailing edge 58 of the blade. The airfoil profile 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58.

The median line follows the centres of these inscribed circles and the deviation or distance from the chord 60 is called the camber f. The asymmetry can also be defined by use of parameters called the upper camber and lower camber, which are defined as the distances from the chord 60 and the suction side 54 and pressure side 52, respectively.

Airfoil profiles are often characterised by the following parameters: the chord length c, the maximum camber f, the position df of the maximum camber f, the maximum airfoil thickness t, which is the largest diameter of the inscribed circles along the median camber line 62, the position dt of the maximum thickness t, and a nose radius (not shown). These parameters are typically defined as ratios to the chord length c.

Wind turbine blades are generally formed from fibre-reinforced plastics material, i.e. glass fibres and/or carbon fibres which are arranged in a mould and cured with a resin to form a solid structure. Modern wind turbine blades can often be in excess of 30-40 meters in length, having blade root diameters of several meters.

Generally, wind turbine blades are manufactured as separate shell parts, which are subsequently assembled together to form the wind turbine blade structure. In preferred techniques, the wind turbine blade is assembled from at least one shell member substantially forming an upwind or pressure-side surface of a wind turbine blade profile, and at least one shell member substantially forming a downwind or suction-side surface of a wind turbine blade profile.

Figure 6:
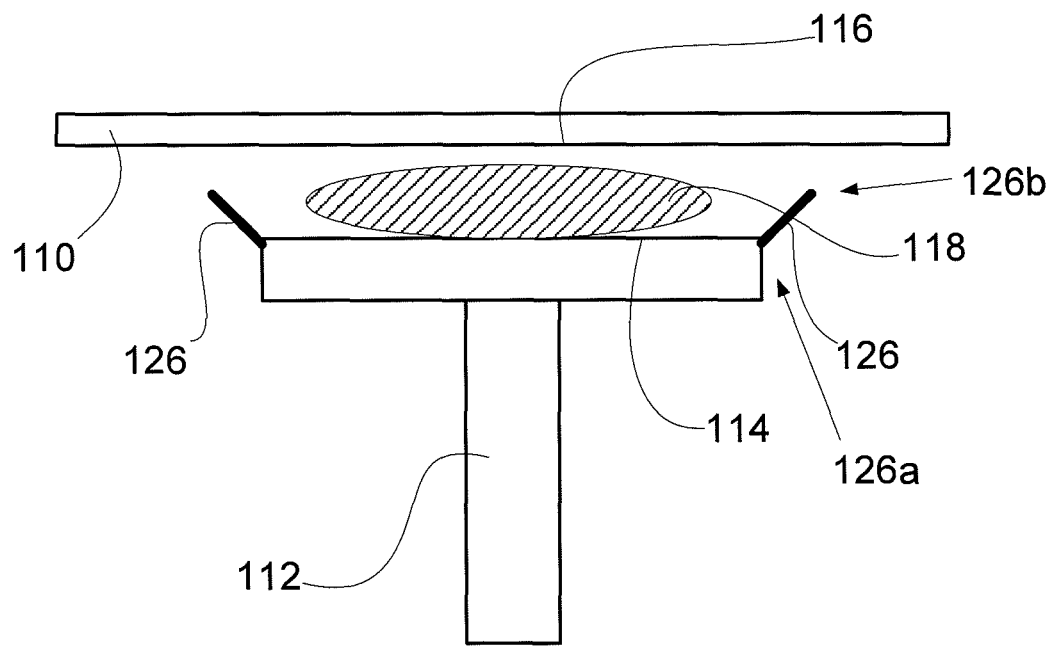
FIGS. 6 and 7 show a portion of a cross-sectional view of a method of assembling components of a wind turbine blade according to an embodiment of the invention, before and after assembly.

With reference to FIG. 6, a cross-section of a portion of a new method of manufacturing a wind turbine blade according to the invention is illustrated. The invention relates to the joining of first and second members of a wind turbine blade, in this case a blade section or shell 110 and a spar element 112. In FIG. 6, the spar element 112 comprises an I-web, but it will be understood that any suitable spar reinforcing element may be used, e.g. a spar box, a shear web, e.g. a C-shaped web, etc.

A first joining surface 114 is provided on the spar element 112, the joining surface 114 arranged to be bonded with an opposed second joining surface 116, defined on the blade shell 110. It will be understood that said surfaces may be pre-treated to enhance the adhesive bonding properties of the surfaces, e.g. the surfaces may be scored or rippled to provide for a stronger mechanical adhesive bond.

First and second adhesive arrestor rails 126 are provided on the spar element 112, at either side of the first joining surface 114. The adhesive arrestor rails 126 extend from the spar element 112 towards the blade shell 110, the rails 126 arranged such that they form a non-orthogonal angle with the second joining surface 116 of the blade shell 110. Preferably, the rails 126 project from the spar element 112 to form a flared collar on either side of said first joining surface 114, forming an acute angle to said second joining surface 116.

A quantity of flowable adhesive 118 is applied to said first joining surface 114, the quantity of adhesive approximately equal to the quantity of adhesive required to ensure a secure bond between the first and second joining surfaces 114,116.

Accordingly, when the spar element 112 is pressed towards the blade shell 110, an adhesive channel is defined between the opposed first and second joining surfaces 114, 116 and side walls provided by the first and second adhesive arrestor rails 126, the side walls of the adhesive channel being tapered towards the second joining surface 116. Furthermore, with reference to FIG. 7, the adhesive 118 provided on the first joining surface 114 is squeezed or pressed by the opposed first and second joining surfaces 114,116 to spread out to fill the adhesive channel, with the arrestor rails 126 acting to retain the flow of adhesive 118 within the channel. As a result, the adhesive 118 is guaranteed to fill the space between the first and second joining surfaces 114,116, regardless of the initial distribution of adhesive on the first surface 114 and/or the angle in which the spar element 112 is pressed towards the blade shell 110. The flowable adhesive 118 is then cured into an adhesive layer 128, which bonds the respective first and second joining surfaces 114, 116.

In a further advantage, the use of arrestor rails 126 provided on either side of the first joining surface 114 provides a suitable receiving platform to receive a quantity of flowable adhesive 118 during the assembly and manufacturing process, thereby increasing the simplicity of the manufacturing process for operators, and reducing the possibility of wasteful spillages of adhesive 118.

It has been found that the likelihood of substantial crack or fault formation at the interface between a layer of adhesive and the internal surface of a blade shell is directly related to the energy release rate (ERR) of the adhesive layer. A larger ERR results in a reduced likelihood of substantial crack formation in the wind turbine blade. Accordingly, it is desirable to reduce the ERR of the adhesive bond layer 128 formed between the joining surfaces 114,116, to improve the reliability of the joint between the blade shell 110 and the spar element 112.

Crack formation is most likely to occur at the edges of the adhesive bond layer 128, at the interface to the second joining surface 116. As the ERR of the adhesive bond layer 128 at a point is directly related to the cross-sectional area of the layer at that point, accordingly reducing the height of the adhesive bond layer 128 above the surface of the second joining surface 116 at the edges of the layer 128 will result in a reduction in ERR at these boundaries, consequently providing a considerable reduction in the possibility of substantial crack formation at these boundary locations.

Arranging the adhesive arrestor rails 126 in an angled projection from the spar element 112 towards the blade shell 110, to form acute angles with the second joining surface 116 of the blade shell 110, results in the formation of a tapering profile at the edges of the adhesive bonding layer 128. This provides an adhesive layer 128 with a reduced ERR when compared to the prior art systems, resulting in a reduction in the possibility of crack formation during the lifetime of the wind turbine blade. Thus, the system of the invention provides a considerable advantage over prior art methods for joining wind turbine blade components.

Preferably, the adhesive arrestor rails 126 are substantially planar members, preferably formed from a moulded fibre-composite material, e.g. biax 450 g/m2, preferably using two plies per arrestor rail. The arrestor rails may be formed from a pultrusion process.

The rails 126 project from a first end 126a located at the spar element 112, to a second end 126b, which is located adjacent the second joining surface 116 of the blade shell 110 once the spar element 112 and the blade shell 110 are pressed together. Preferably, the second end 126b abuts the second joining surface 116 once the spar element 112 and the blade shell 110 are pressed together, forming a barrier or wall between the first and second surfaces 114,116, but it will be understood that the second end 126b may rest a short distance from the second surface 116 after the step of pressing. Preferably, the second end 126b is at most 5 mm away from the second surface 116 after said step of pressing. Such a small distance will result in a relatively low height of the adhesive layer 128 above the second surface 116, maintaining a relatively low ERR at the boundary of the adhesive layer 128 defined by the arrestor rails 126.

Figure 7:
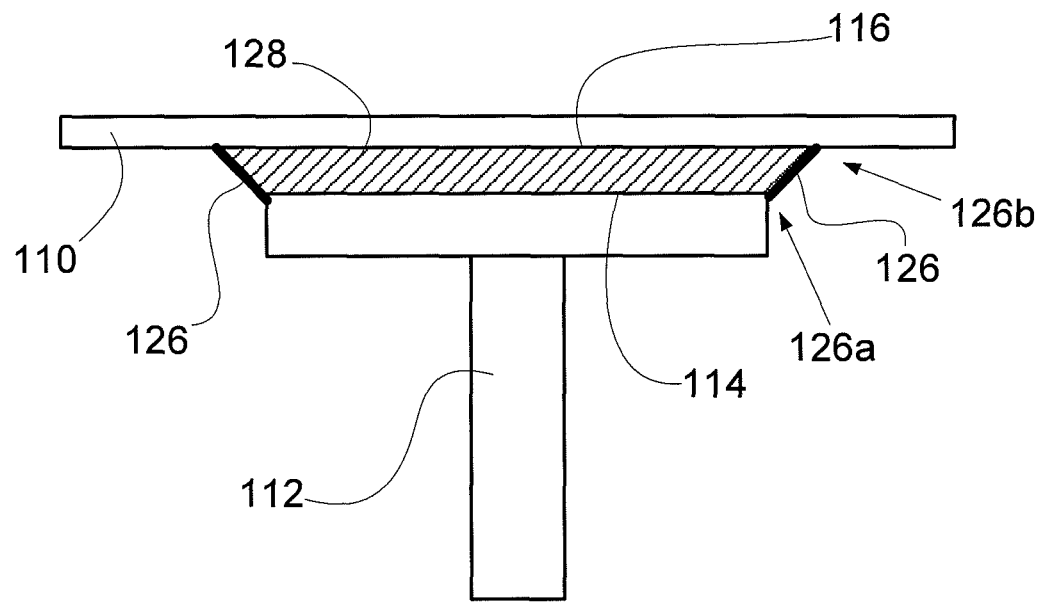

While the embodiment of FIGS. 6 and 7 illustrate adhesive arrestor rails 126 having a straight planar profile, it will be understood that other cross-sectional rail profiles may be used. For example, with reference to FIGS. 8 and 9, a second embodiment of the invention is illustrated.

Figure 8:
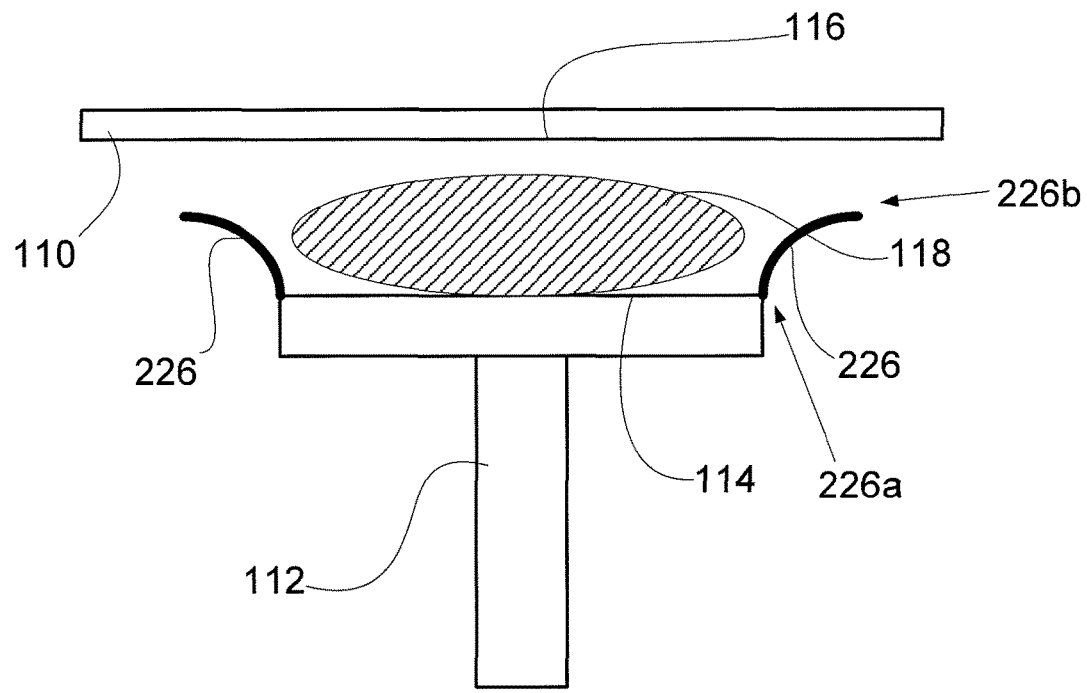
FIGS. 8 and 9 show a portion of a cross-sectional view of a method of assembling components of a wind turbine blade according to a second embodiment of the invention, before and after assembly.

The embodiment of FIG. 8 is similar to the embodiment of FIG. 6, with the distinction that arrestor rails having a curved cross-sectional profile 226 are used. The rails 226 curve between first end 226a provided adjacent the first joining surface 114 and second end 226b arranged to abut the opposed second joining surface 116. In this embodiment, the rails 226 are arranged to flare outwards from the adjacent first joining surface 114, presenting a convex face towards the opposed second joining surface 116. The method of applying flowable adhesive 118, pressing together the spar element 112 and blade shell 110 to spread the adhesive 118 between the arrestor rails 226, and subsequently curing the adhesive 118 into the adhesive layer 128 (FIG. 9) are carried out as described above in relation to the first embodiment.

Figure 9:
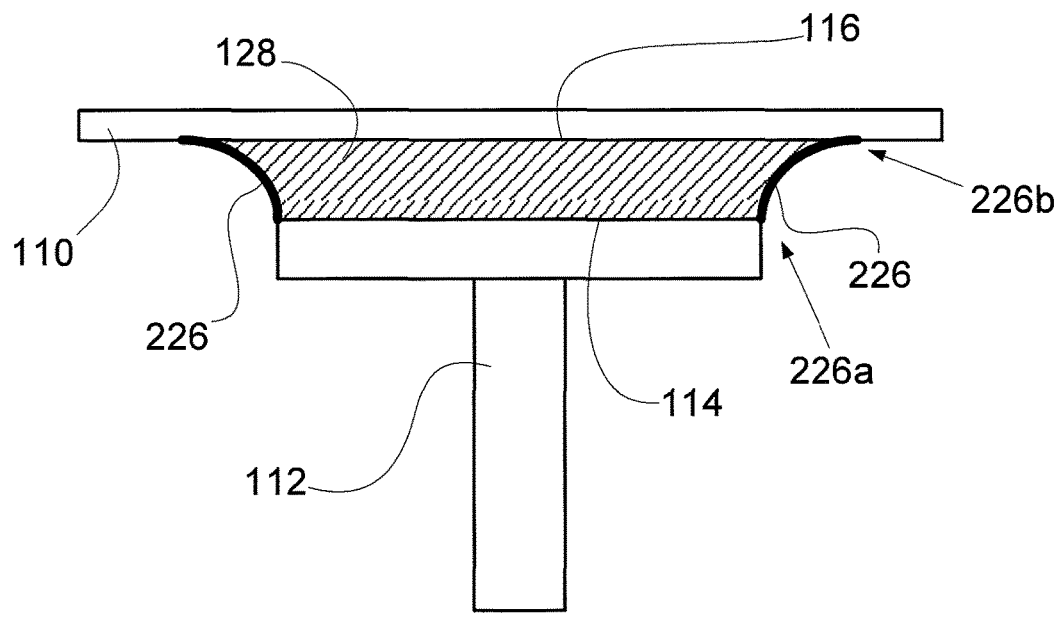

This curved shape of adhesive arrestor rail 226 results in a more even distribution of forces in the subsequently-cured adhesive bond layer 128, as seen in FIG. 9. Such an even force distribution provides a further reduction in the likelihood of crack or fault formation in the adhesive bond layer 128.

In a further preferred aspect of the invention, at least one adhesive arrestor rail may be provided as a relatively flexible member. In such a case, the flexibility of the rail is selected to deflect under pressure, if an excess amount of flowable adhesive is applied between the joining surfaces. In such a case, any excess adhesive can be squeezed past the second end of the rail.

Preferably, the flexibility is further chosen such that the rail is resilient enough to return to an at rest position in contact with or in close proximity to the opposed second joining surface, once the excess adhesive has squeezed past the second end of the rail. In this case, the arrestor rail acts as a simple one-way valve, wherein it can deflect to allow the passage of excess adhesive outside of the channel defined between the joining surfaces and the adhesive arrestor rail, and can subsequently return to an at-rest position defining a tapering edge of the adhesive bonding layer.

Figure 10:
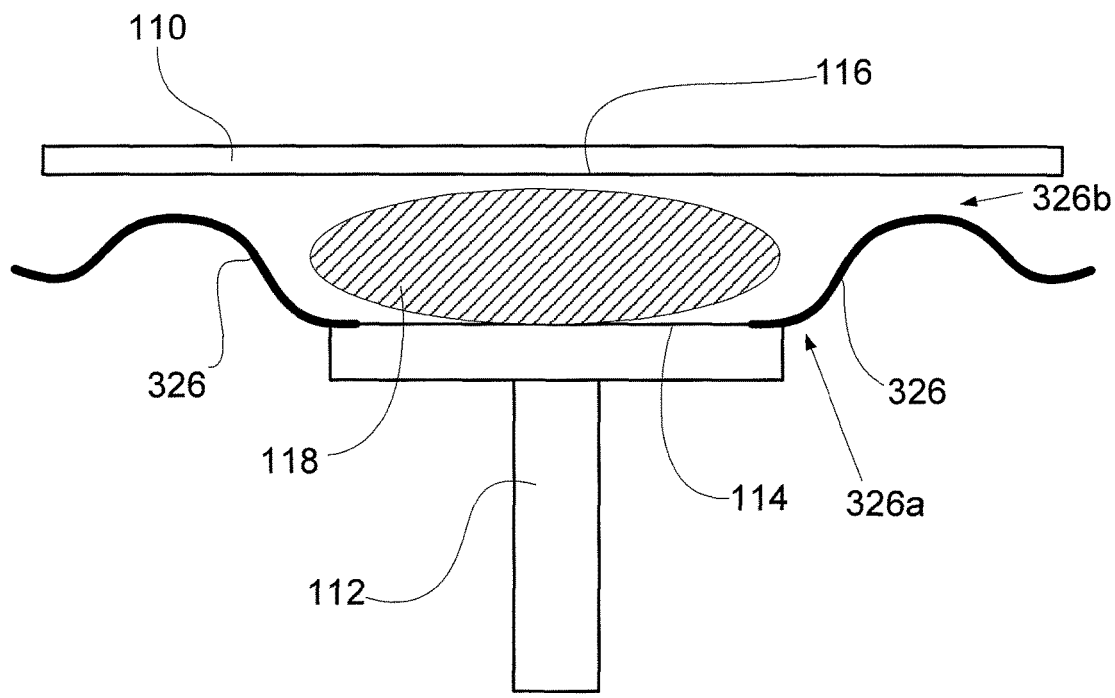
FIGS. 10 and 11 show a portion of a cross-sectional view of a method of assembling components of a wind turbine blade according to a third embodiment of the invention, before and after assembly.
Figure 11:
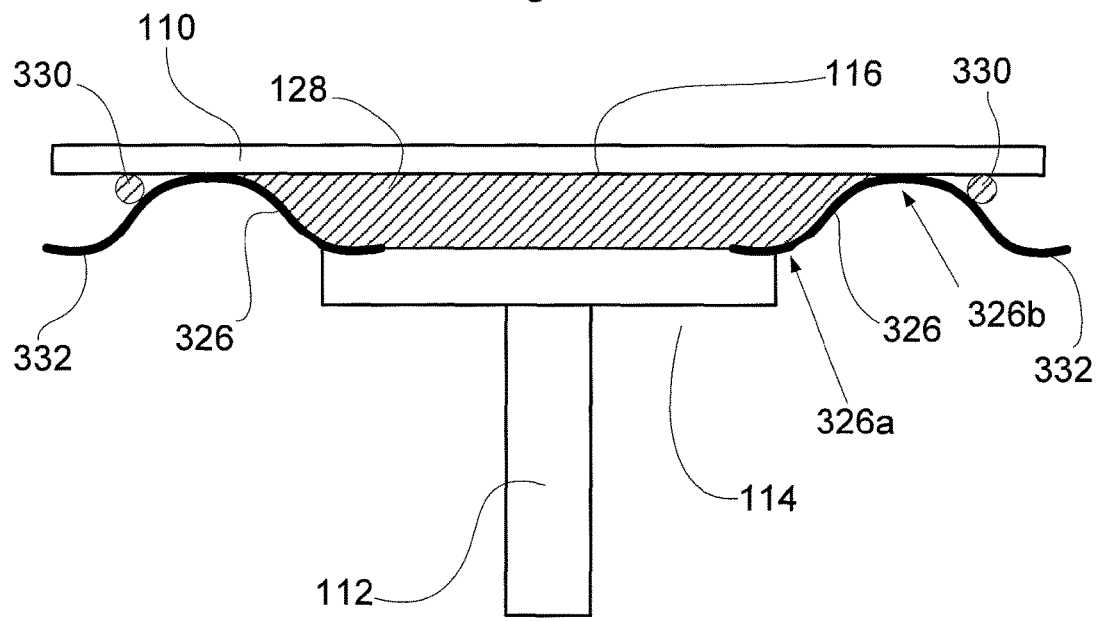

A further embodiment of the invention is illustrated in FIGS. 10 and 11, wherein the adhesive arrestor rails 326 comprise a substantially sine wave-shaped profile. The rails 326 are arranged adjacent opposite sides of the first joining surface 114, having a first end 326a provided at the first joining surface 114 and a notional second end 326b arranged towards the opposed second joining surface 116. The first and second ends 326a,326b are arranged approximately at successive maximum and minimum points of the sine wave profile, such that the rail 326 will provide a curved side wall profile of the adhesive channel created when the spar element 112 is pressed against the blade shell 110.

As the rail 326 is formed from a relatively flexible material, it is arranged to deflect when an excess amount of adhesive is provided in the adhesive channel defined between the first and second joining surfaces 114,116 and the opposed rails 326. Once the excess is squeezed out of the adhesive channel, the rail 326 can return to an at-rest position in contact with the second joining surface 116. With reference to FIG. 11, the excess adhesive subsequently cures into portions of an adhesive layer adjacent the notional second end 326b of the rails 326, indicated at 330.

The rail 326 is shaped to continue beyond said notional second end 326b, to effectively provide a retaining flange 332 for any excess adhesive 330 which may be extruded past the notional second ends 326b of the arrestor rails 326. The retaining flanges 332 can act to prevent the flowable excess adhesive from dripping beyond the flange 332, and/or in the case of excess adhesive that has cured into a layer 330 the flange 332 can act to hold the excess in place adjacent the blade shell 110. If the excess layer 330 snaps off from the blade shell 110, the flange 332 can retain the cured pieces of adhesive 332 next to the blade shell 110, and prevent such debris from falling about the greater interior of the wind turbine blade.

It will be understood that various other technical features may be combined with the features of the above-described embodiments. For example, while the second end 126b,226b 326b of the arrestor rail 126,226,326 is preferably a straight edge to form a solid barrier or wall against the second joining surface 116, it will be understood that in some embodiments the second end 126b of the arrestor rail 126 may be profiled or shaped, e.g. a serrated or corrugated edge, in order to facilitate the passage of excess adhesive beyond said second end 126b,226b,326b. This feature may be used in combination with, or in place of, the feature of a relatively flexible adhesive arrestor 126,226,326.

It will be understood that the arrangement of the adhesive arrestor rails with respect to the first and second joining surfaces may be interchangeable. For example, the adhesive arrestor rails may be provided extending from the second joining surface defined on the blade shell towards the first surface defined on the spar element. Additionally, while the embodiments described above refer to the joining of a spar element to a blade shell, by providing flowable adhesive on a surface of the spar element, it will be understood that the invention is equally applicable to the instance where the flowable adhesive is applied to the surface of the blade shell, with the spar element subsequently joined to this surface.

The adhesive arrestor rails may be mounted to or adhered to the spar element or blade shell. For example, the spar element may be provided with a plurality of snap-fit connecting elements, with corresponding elements providing at said first end of the arrestor rail, enabling a relatively easy mounting of the adhesive arrestor rail to the spar element. In a preferred embodiment, the adhesive arrestor rails are formed integrally with the spar element, e.g. as part of a pultruded shear web profile.

In one aspect, the adhesive arrestor rails may be removed from the spar element, either while the adhesive bond layer is curing, or after curing has been completed.

While the arrestor rails may be applied along the entire length of the wind turbine blade, in one aspect the rails are only applied along the length of the blade where it is most desired to prevent failure of the adhesive bond between blade members. In a preferred aspect, the arrestor rails are provided along a portion of the inboard section of the wind turbine blade, towards the root end of the blade. Preferably, the arrestor rails are applied in the area between the root end and the point along the length of the blade having the maximum chord length of the wind turbine blade.

In one aspect, the arrestor rails may comprise a marker or a tracer element (not shown) which acts to highlight the location of the arrestor rails during a surveying operation, e.g. a non-destructive testing operation such as an ultrasonic scanning of an assembled wind turbine blade. Such a marker or tracer may be a material having a different density, preferably an increased density, relative to the remainder of the arrestor rail, such that the marker or tracer can easily be detected during such a surveying or scanning operation. This allows a worker to easily identify the location of the adhesive bond layers in an assembled wind turbine blade, and may aid in determining if the blade components are sufficiently bonded together. Preferably, the marker or tracer comprises a strip of relatively dense material provided at the said second end of the arrestor rail, thereby defining the boundary of the cured adhesive bond layer provided in the above-described adhesive channel defined between the opposed joining surfaces and the adhesive rails.

It will be understood that the method of the invention may further provide for the case wherein a single adhesive arrestor rail is used, at a first side of the joining surface. In this case, flowable adhesive may be applied adjacent the single rail, wherein the action of pressing the two members together will result in the adhesive abutting the rail and being squeezed in a direction away from the rail, to substantially fill the area between the two joining surfaces.

The use of adhesive arrestor rails as described above in the method of the invention provides for the assembly of wind turbine components having an improved adhesive bonding. Such bonded components can be subsequently assembled into a larger wind turbine blade structure having improved reliability and requiring reduced number of repair operations.

The invention is not limited to the embodiments described herein, which may be modified or adapted without departing from the scope of the present invention.

The invention claimed is:

1. A method of manufacturing a wind turbine blade, comprising the steps of:
   providing a first member having a first joining surface;
   providing a second member having a second joining surface;
   providing at least one adhesive arrestor rail at a first side of said first joining surface of said first member;
   providing a quantity of flowable adhesive between said first and second joining surfaces;
   pressing said first and second members together, to spread said quantity of flowable adhesive to form an adhesive layer between said first and second joining surfaces; and
   curing said adhesive layer to bond said first member to said second member,
   wherein said at least one adhesive arrestor rail is formed of a flexible material, such that during said step of pressing, said at least one adhesive arrestor rail is arranged to deflect to allow excess flowable adhesive to be extruded past said at least one adhesive arrestor rail,
   wherein said step of pressing is performed until an amount of excess flowable adhesive is extruded past said at least one adhesive arrestor rail, to indicate that said flowable adhesive substantially fills the space between said first and second joining surfaces at said first side,
   wherein said at least one adhesive arrestor rail has a first end and a second free end, said at least one adhesive arrestor rail comprising a retaining flange located adjacent the second free end, said retaining flange being arranged to retain the amount of excess flowable adhesive extruded past the second free end of said at least one adhesive arrestor rail, and
   wherein the method comprises the step of providing said at least one adhesive arrestor rail with one of a marker element or a reflective element, whereby said marker element or said reflective element enables a location of a position of the marker element or the reflective element to be determined following the manufacturing of the wind turbine blade.

2. The method of claim 1, comprising the steps of:
   providing a first adhesive arrestor rail of said at least one adhesive arrestor rail at a first side of said first joining surface; and
   providing a second adhesive arrestor rail of said at least one adhesive arrestor rail at an opposed second side of said first joining surface,
   such that an adhesive channel is defined by said first and second joining surfaces and said first and second adhesive arrestor rails after said step of pressing.

3. The method of claim 2, wherein said second adhesive arrestor rail is formed from the flexible material, and wherein said step of pressing is performed until an amount of excess flowable adhesive is extruded past said first and second adhesive arrestor rails, to indicate that said flowable adhesive substantially fills the adhesive channel between said first and second members.

4. The method of claim 2, wherein said step of providing a quantity of flowable adhesive comprises selecting a quantity of flowable adhesive to be applied such that the adhesive layer substantially fills said adhesive channel after said step of pressing.

5. The method of claim 4, wherein said step of selecting comprises selecting a quantity of flowable adhesive having a greater volume per unit length than the volume per unit length enclosed by said adhesive channel, such that said adhesive channel is filled by the adhesive layer after said step of pressing.

6. The method of claim 5, wherein said step of selecting comprises selecting a quantity of flowable adhesive of at least 105% of volume per unit length of said adhesive channel.

7. The method of claim 6, wherein said step of selecting comprises selecting a quantity of flowable adhesive of at least 110% of volume per unit length of said adhesive channel.

8. The method of claim 2, wherein a resilience of said flexible material of the at least one adhesive arrestor rail is selected such that during said step of pressing, said at least one adhesive arrestor rail is arranged to deflect to extrude said amount of excess flowable adhesive past said at least one adhesive arrestor rail, and wherein said at least one adhesive arrestor rail is arranged to return to an undeflected state after the amount of excess flowable adhesive has been extruded past said at least one adhesive arrestor rail.

9. The method of claim 1, wherein said at least one adhesive arrestor rail is arranged at a non-orthogonal angle to the second joining surface of said second member, such that said adhesive layer comprises a substantially tapering profile at said first side of said first joining surface.

10. The method of claim 1, wherein said first member is provided as at least a portion of a spar element of the wind turbine blade.

11. The method of claim 10, wherein said at least one adhesive arrestor rail is attached to said at least a portion of a spar element of the wind turbine blade.

12. The method of claim 10, wherein said at least one adhesive arrestor rail is integrally formed with said at least a portion of a spar element of the wind turbine blade.

13. The method of claim 1, wherein said at least one adhesive arrestor rail is provided such that the first end of said at least one adhesive arrestor rail is attached to said first member adjacent said first joining surface, wherein after said step of pressing, the second free end of said at least one adhesive arrestor rail is located adjacent said second joining surface of said second member.

14. The method of claim 13, wherein said at least one adhesive arrestor rail is provided such that after said step of pressing said second free end of said at least one adhesive rail is arranged at an acute angle to said second joining surface of said second member.

15. The method of claim 1, comprising the step of providing said at least one adhesive arrestor rail having a curved cross-sectional profile, such that after said step of pressing said adhesive layer assumes a corresponding curved cross-sectional profile at said first side of said first joining surface.

16. The method of claim 1, wherein said at least one adhesive arrestor rail comprises a substantially sine-wave-shaped profile.

17. The method of claim 1, wherein said second member is provided as at least a portion of a shell of the wind turbine blade.

18. The method of claim 1, wherein said step of pressing is performed until the amount of excess flowable adhesive is extruded past the second a free end of said at least one adhesive arrestor rail, along substantially an entire longitudinal length of the said at least one adhesive arrestor rail.

19. A wind turbine blade, comprising:

a first member having a first joining surface;

a second member having a second joining surface; and at least one adhesive arrestor rail configured to be arranged at a first side of said first joining surface, wherein said first member is bonded to said second member by a quantity of flowable adhesive cured to form an adhesive layer between said first and second joining surfaces, wherein said at least one adhesive arrestor rail is formed of a flexible material and arranged to deflect, when said first and second members are pressed together, to allow an amount of excess flowable adhesive to be extruded past said at least one adhesive arrestor rail to indicate that said flowable adhesive substantially fills a space between said first and second joining surfaces at said first side, wherein the at least one adhesive arrestor comprises a marker element or a reflective element, whereby the marker element or the reflective element is configured to enable a location of a position of the marker element or the reflective element to be determined following manufacture of the wind turbine blade, and wherein said at least one adhesive arrestor rail has a first end and a second free end, said at least one adhesive arrestor rail comprising a retaining flange located adjacent the second free end, said retaining flange being arranged to retain the amount of excess flowable adhesive extruded past the second free end of said at least one adhesive arrestor rail.

20. A wind turbine blade, comprising:

a first member having a first joining surface;

a second member having a second joining surface; and at least one adhesive arrestor rail configured to be arranged at a first side of said first joining surface, wherein said first member is bonded to said second member by a quantity of flowable adhesive cured to form an adhesive layer between said first and second joining surfaces, wherein said at least one adhesive arrestor rail is formed of a flexible material and arranged to deflect, when said first and second members are pressed together, to allow an amount of excess flowable adhesive to be extruded past said at least one adhesive arrestor rail to indicate that said flowable adhesive substantially fills a space between said first and second joining surfaces at said first side, wherein the at least one adhesive arrestor comprises a marker element or a reflective element, whereby the marker element or the reflective element is configured to enable a location of a position of the marker element or the reflective element to be determined following manufacture of the wind turbine blade, and wherein said at least one adhesive arrestor rail comprises a substantially sine-wave-shaped profile.

\* \* \* \* \*